United States Patent [19]
Kasetty et al.

[11] Patent Number: 5,883,761
[45] Date of Patent: Mar. 16, 1999

[54] MAGNETIC READ/WRITE HEAD ACTUATOR ASSEMBLY HAVING ASYMMETRIC STATOR MAGNETS

[75] Inventors: Kumaraswamy Kasetty, Northboro; He Huang, Shrewsbury, both of Mass.

[73] Assignee: Quantum Corporation, Milpitas, Calif.

[21] Appl. No.: 897,803

[22] Filed: Jul. 21, 1997

[51] Int. Cl.$^6$ .................................................. G11B 5/55
[52] U.S. Cl. ................................................................ 360/106
[58] Field of Search .......................... 360/97.01, 98.01, 360/105, 106

[56] References Cited

U.S. PATENT DOCUMENTS

| | | | |
|---|---|---|---|
| 5,233,493 | 8/1993 | Eliason | 380/106 |
| 5,329,267 | 7/1994 | Endoh et al. | 360/106 |
| 5,396,388 | 3/1995 | Brown | 360/106 |
| 5,566,375 | 10/1996 | Isomura | 360/105 |
| 5,581,424 | 12/1996 | Dunfield et al. | 360/105 |
| 5,621,590 | 4/1997 | Pace et al. | 360/106 |
| 5,621,591 | 4/1997 | Rahimi et al. | 360/106 |

FOREIGN PATENT DOCUMENTS 63-50973  3/1988  Japan .

*Primary Examiner*—Jefferson Evans
*Attorney, Agent, or Firm*—Robert V. Klauzinski; Debra A. Chun

[57] ABSTRACT

An improved magnetic read/write head actuator assembly for use within a storage disk system that reduces average access time. The actuator assembly includes an actuator arm mounted on pivotal hub. A read/write head is supported at a distal end of the actuator arm such that the head is positioned in close proximity to a rotating magnetic storage disk. An actuator motor cooperates with the actuator arm to provide pivotal motion to the actuator arm about a central pivot axis. The actuator motor includes an asymmetric rotor winding connected to the actuator arm at an end opposite the distal end and an asymmetrical stator magnet structure that is statically mounted in close proximity to the asymmetric rotor winding. The actuator motor, further includes a flux conductive member that forms a closed flux path through the rotor winding and the asymmetrical stator magnet structure. The asymmetric geometry of the stator magnet structure generates an increased magnetic field strength and magnetic field density in a region of the magnet structure that comprises a greater portion of magnetic material. Therefore, when the asymmetric rotor winding reacts with the region of the stator magnet that has the greater portion of magnetic material, an increased torque vector force is realized by the asymmetric rotor winding. The increased torque vector force realized by the rotor is transposed to the actuator arm for increasing the pivotal speed of the actuator arm about the central pivot axis during access of outer diameter tracks of a magnetic storage disk.

16 Claims, 6 Drawing Sheets

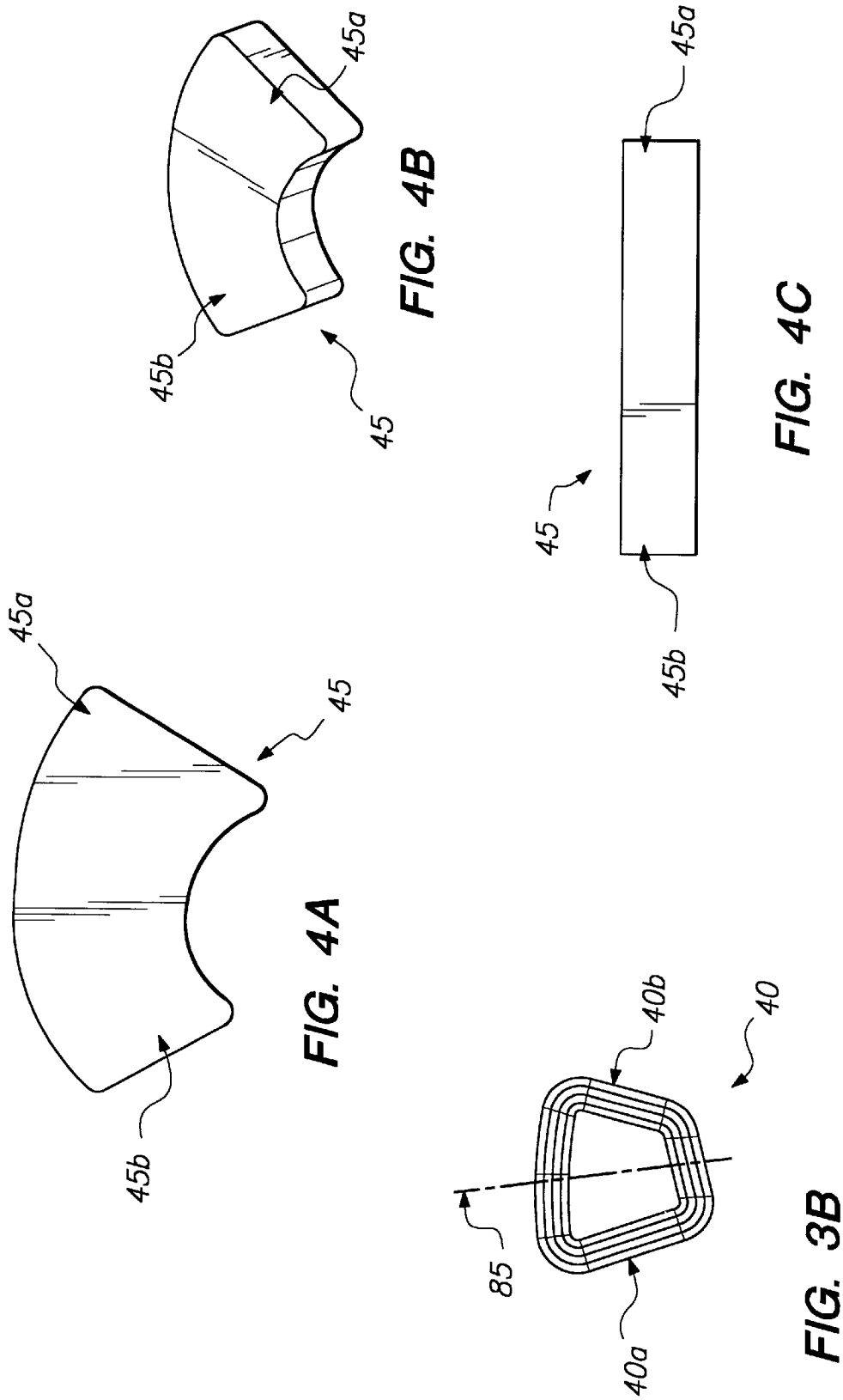

MAGNETIC READ/WRITE HEAD ACTUATOR ASSEMBLY HAVING ASYMMETRIC STATOR MAGNETS

CROSS-REFERENCE TO RELATED PATENTS

This invention is related to the disclosure of the following patent of which is assigned to the assignee of this application as of the date of filing: U.S. Pat. No. 5,621,590, entitled, "Actuator Apparatus With Plastic C-Block" to Pace et. al., the disclosure thereof being incorporated herein by reference.

FIELD OF THE INVENTION

The invention relates generally to a magnetic read/write head actuator assembly for a disk drive and more precisely to a magnetic read/write head actuator assembly having asymmetric actuator motor magnets.

BACKGROUND OF THE INVENTION

In disk-type magnetic recording systems for digital applications, magnetic transducer elements, or heads, are used to record information onto (i.e., write) or retrieve information from (i.e., read) the disk surface or surfaces. Each storage disk comprises an annular substrate onto which is deposited a magnetic recording medium. Each disk surface is divided into several concentric, annular bands, or "tracks" each having a predetermined radial extent. Adjacent tracks are separated by an unused buffer zone. Each head is supported in close proximity to an associated disk surface by a head positioning assembly, or actuator, that supports the head near the disk surface and moves it from one radial position to another, thereby permitting use of a single head for reading and writing on multiple tracks. The positioner assembly for each head or group of heads includes an actuator arm and an actuator motor. The actuator motor moves the actuator arm, to change the position of the head with relation to the tracks on the disk. A disk drive may include a plurality of stacked disks, and one actuator motor may be used to move a corresponding number of actuator arms in unison.

In particular, positioner assemblies of the prior art typically consist of several arms, in spaced apart relationship, stacked one above the other, pivoted at their centers on a common pivot, with read/write heads mounted at one end and the moving winding(s) of the rotor of the actuator motor mounted at the other. The stator portion of the motor includes permanent magnets and a flux conductive member that form a closed flux conductive path for the actuator motor. The winding thus also acts as a counterweight to balance the heads.

During operation, the positioner assembly provides high speed disk file access by positioning the read/write heads in a transducing relationship with a rotating magnetic storage disk. Such operation requires, first, that the position of the read/write head relative to a track on the disk be maintained within extremely close tolerances; and, second, that the access time (that is, the time required to move the head from one track to another desired track) be short. The state of the art concerning the first requirement necessitates that a control system, preferably utilizing feedback, be employed to sense the deviation of the position of the head from an optimum read/write position over the track, and to generate a correction signal for driving the actuator motor. A short access time, on the other hand, requires a number of different considerations such as the moving mass and inertia of the positioner and heads. The access time is further affected by the torque generated from the actuator motor that is ultimately transposed on to the positioner assembly.

One alternative for minimizing disk file access time is to increase the torque vector of the actuator motor for increasing the acceleration and deceleration of the positioner assembly. However, in order to increase the torque vector of an actuator motor, a proportional increase in overall motor size is required. Another alternative for increasing the acceleration and deceleration of the positioner assembly is to increase the magnitude of the current profiles supplied to the actuator motor windings. Both of the above described methods increase the acceleration and deceleration of the positioner assembly, however, either method causes an undesirable increase in power consumption. Furthermore, the former method, i.e., an increase in actuator motor size, undesirably requires additional physical space within the disk drive system.

It has been realized that typical disk drive systems write or read data to or from a disk storage surface starting from the outer diameter tracks and progressively write or read inwardly towards the inner diameter tracks. The reasoning for such formatting is that a greater number of data bits may be stored at the outer diameter tracks than at the inner diameter tracks, thereby minimizing the need to radially move the read/write head to subsequent data tracks. Minimizing radial movement of the read/write head increases data transfer rates and generally improves performance of the disk drive system. Typically, the majority of the unused portion of the disk drive system is located at the inner diameter track region of the storage disk. Thus, the desire for minimizing average disk file access may be accomplished by increasing the actuator torque vector when the actuator motor is positioning the read/write heads at the outer diameter tracks while maintaining the access time to inner diameter tracks virtually unchanged.

Thus, a hitherto unsolved need has remained for an actuator motor that will reduce average access time to a disk file storage system by increasing the actuator motor torque vector when accessing outer diameter tracks while maintaining the access time to inner diameter tracks virtually unchanged. Moreover, an unsolved need has remained for an actuator motor that provides minimized average access time to a disk file storage system with no appreciable increase in power consumption.

SUMMARY OF THE INVENTION

An improved actuator assembly according to principles of the present invention includes an actuator motor having one or more asymmetric motor magnets. The improved actuator assembly further has an actuator arm mounted on a pivot so that the arm can rotate over a limited angular range with respect to a rotating magnetic storage disk, e.g., plus or minus 20-degrees. A read/write head is mounted at a distal end of the arm such that the head may be positioned over and in close proximity to a rotating storage disk. The actuator assembly is pivoted over the angular range by means of an actuator motor. The actuator motor includes a rotor winding connected to the actuator arm at an end opposite the distal end. The rotor winding is positioned in close proximity to one or more statically mounted asymmetrical stator magnets. The asymmetric shape of the stator magnet causes one region of the magnet to have a greater portion of magnetic material and another region of the stator magnet to have a lower portion of magnetic material. Consequently, the region of the magnet that has a greater portion of magnetic material will generate a greater magnetic field strength than the region of the magnet that has the lower portion of magnetic material. Accordingly, when the rotor winding reacts with the region of the magnet that has the greater portion of magnetic material, the increased magnetic field strength in that region will cause a proportional increase in the torque vector force exerted on the rotor winding. Since the rotor winding is connected to the actuator arm at the outer diameter region of the magnetic storage disk, the increased torque vector force exerted on the winding increases the pivotal speed of the actuator arm at the outer diameter region of the magnetic storage disk. Therefore, since the data tracks positioned at the outer diameter region of the storage disk comprise a greater bit density, which are more frequently accessed than inner diameter tracks, an increase in access time to said outer diameter tracks minimizes the average access time of data stored on the magnetic storage disk.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 3 (*b*) is a plan view of the asymmetric rotor winding.

FIG. 4 (*a*) is a plan view of the asymmetric motor magnet of FIGS. 1–2.

FIG. 4 (*b*) is an isometric view of the asymmetric motor magnet of FIGS. 1–2.

FIG. 4 (*c*) is a side view of the asymmetric motor magnet of the FIGS. 1–2.

DETAILED DESCRIPTION OF A PREFERRED EMBODIMENT

Figure 1:
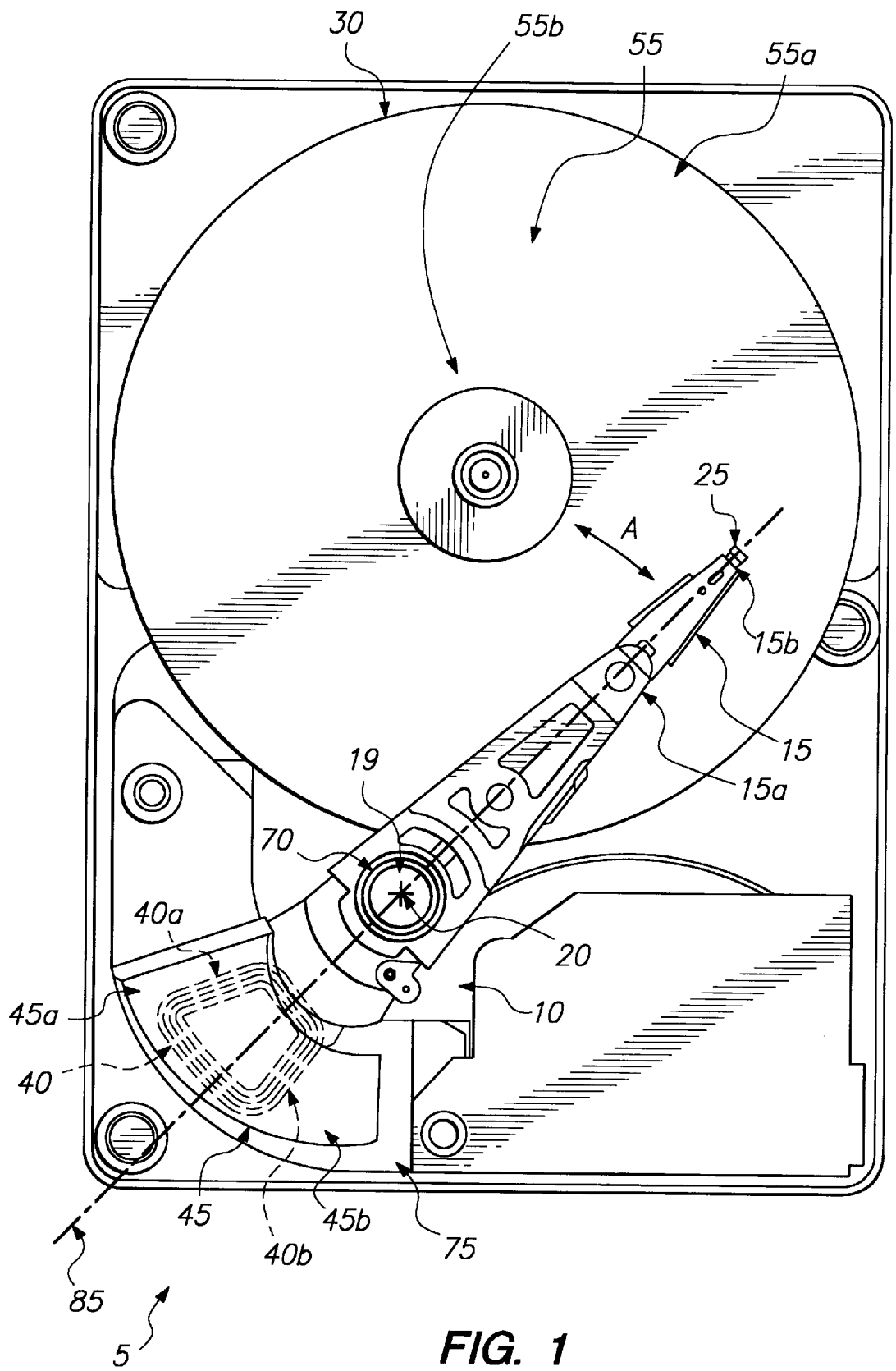
FIG. 1 is a plan view of a magnetic storage disk system having principles of the present invention.
Figure 2:
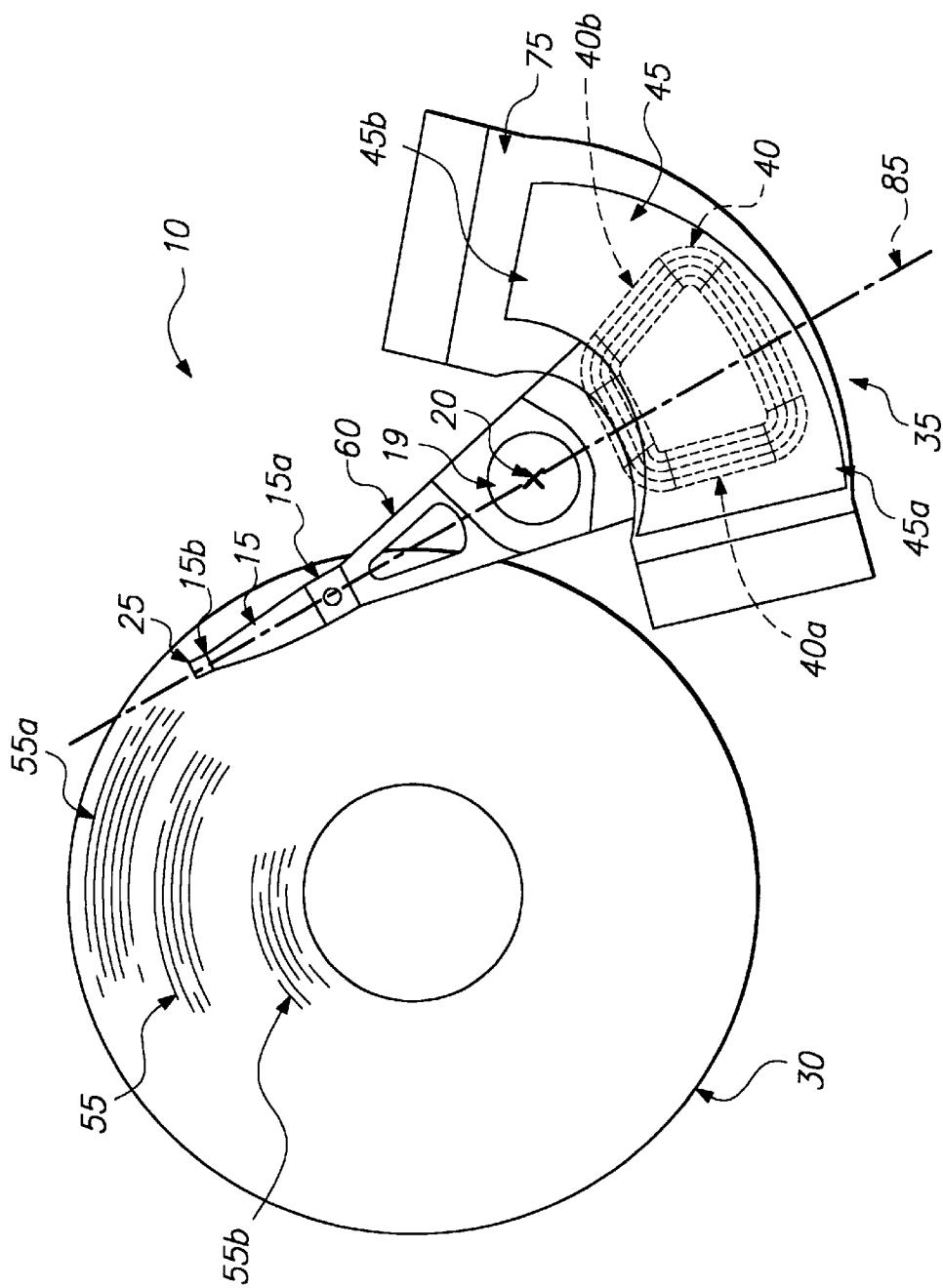
FIG. 2 is a plan view of a magnetic read/write head actuator assembly having principles of the present invention.

Referring to FIGS. 1 and 2, one embodiment of the present invention as set forth herein is disk drive 5 having an improved magnetic read/write head actuator assembly 10. The improved actuator assembly 10 of the present invention includes an actuator arm 15 mounted on a pivot hub 19. The read/write head 25 is supported at a distal end of the actuator arm such that the head is positioned in close proximity to a rotating magnetic storage disk 30. An actuator motor 35 cooperates with the actuator arm 15 to provide pivotal motion to the actuator arm 15 about a central pivot axis 20. The actuator motor 35 includes a rotor winding 40 connected to the actuator arm 15 at an end opposite the distal end 15*b* and an asymmetrical stator magnet 45 structure that is statically mounted in close proximity to the rotor winding 40. The actuator motor 35, further includes a flux conductive member 75 that forms a closed flux path through the rotor winding 40 and the asymmetrical stator magnet 45 structure. The asymmetric geometry of the stator magnet generates an increased magnetic field strength and magnetic field density in a region of the magnet 45 structure that comprises a greater portion of magnetic material. Therefore, when the rotor winding 40 reacts with the region of the stator magnet 45 that has the greater portion of magnetic material, an increased torque vector force is realized by the rotor winding 40. The increased torque vector force realized by the rotor winding 40 is transposed to the actuator arm 15 for increasing the pivotal speed of the actuator arm 15 about the central pivot axis 20.

Referring to FIGS. 2 and 3, according to the preferred embodiment of the present invention, the improved magnetic read/write head actuator assembly 10 comprises an actuator arm 15 mounted on a pivotal E-block 50 structure. The read/write head 25 is supported at a distal end 15*b* of the actuator arm 15 such that the head 25 is positioned in close proximity to a rotating magnetic storage disk 30. In particular, the E-block 50 structure pivots to position the read/write heads 25 over a multiplicity of data tracks 55 defined on the surface of the rotating storage disk 30. The actuator motor 35 cooperates with the E-block 50 structure to provide pivotal motion to the magnetic read/write head actuator assembly 10 about the central pivot axis 20. Moreover, the actuator motor 35 includes a rotor winding 40 connected to the E-block 50 structure and an asymmetric stator magnet 45 structure statically mounted in close proximity to the rotor winding 40. The actuator motor 35, further includes a flux conductive member 75 that forms a closed flux path through the rotor winding 40 and the asymmetrical stator magnet 45 structure.

More Precisely, as shown in FIG. 3, the E-block 50 structure includes a central hub portion 56 and a hub-arm portion 60 that extends outwardly from the central hub portion 56. The central hub portion 56 further has a central bore 65 therethrough for accepting a mounting means such as a shaft (not shown). More preferably, the central hub 56 is mounted on a set of ball bearings 70 (FIG. 5) that act as the pivot, about which the E-block 50 structure rotates over a predetermined limited angular range. The E-block 50 structure is comprised of a light-weight aluminum alloy that is sturdy and receptive to machining. A first end of the actuator arm 15*b* is mounted on the hub-arm portion 60 of the E-block 50 and-the read/write head 25 is mounted at a distal end 15*b* of the actuator arm 15 so that the read/write head 25 is positioned in close proximity to the rotating storage disk 30.

The actuator assembly 10 according to another embodiment of the present invention comprises a rotor winding 40, an asymmetrical stator magnet 45 structure, and a rigid flux conductive member 75 that facilitates a magnetic flux path. The rotor winding 40 is wound of an electrically energizable material. Preferably the rotor winding 40 is wound of copper or aluminum wire. The rotor winding 40 is securely mounted on the central hub portion 56 of the E-block 50 structure and is positioned generally opposite the hub-arm portion 60. The asymmetrical stator magnet 45 structure, as shown in FIG. 4, has a substantially flat planar geometry with a wider width at a first end region 45*a* and a narrower width at a second end region 45*b*. Consequently, the first end region 45*a* comprises a greater portion of magnetic material and the second end region 45*b* comprises a lesser portion of magnetic material. The asymmetric stator magnet 45 may be shaped in a plurality of geometries, however, one preferred geometry is an asymmetric arcuate shaped segment that has a substantially smooth transition from the wider first end region 45*a* to a narrower second end region 45b. Furthermore, the preferred asymmetric stator magnet 45 geometry includes a substantially constant thickness. One preferable material for the asymmetrical stator magnet 45 structure is Neodymium-Iron-Boron.

Figure 5:
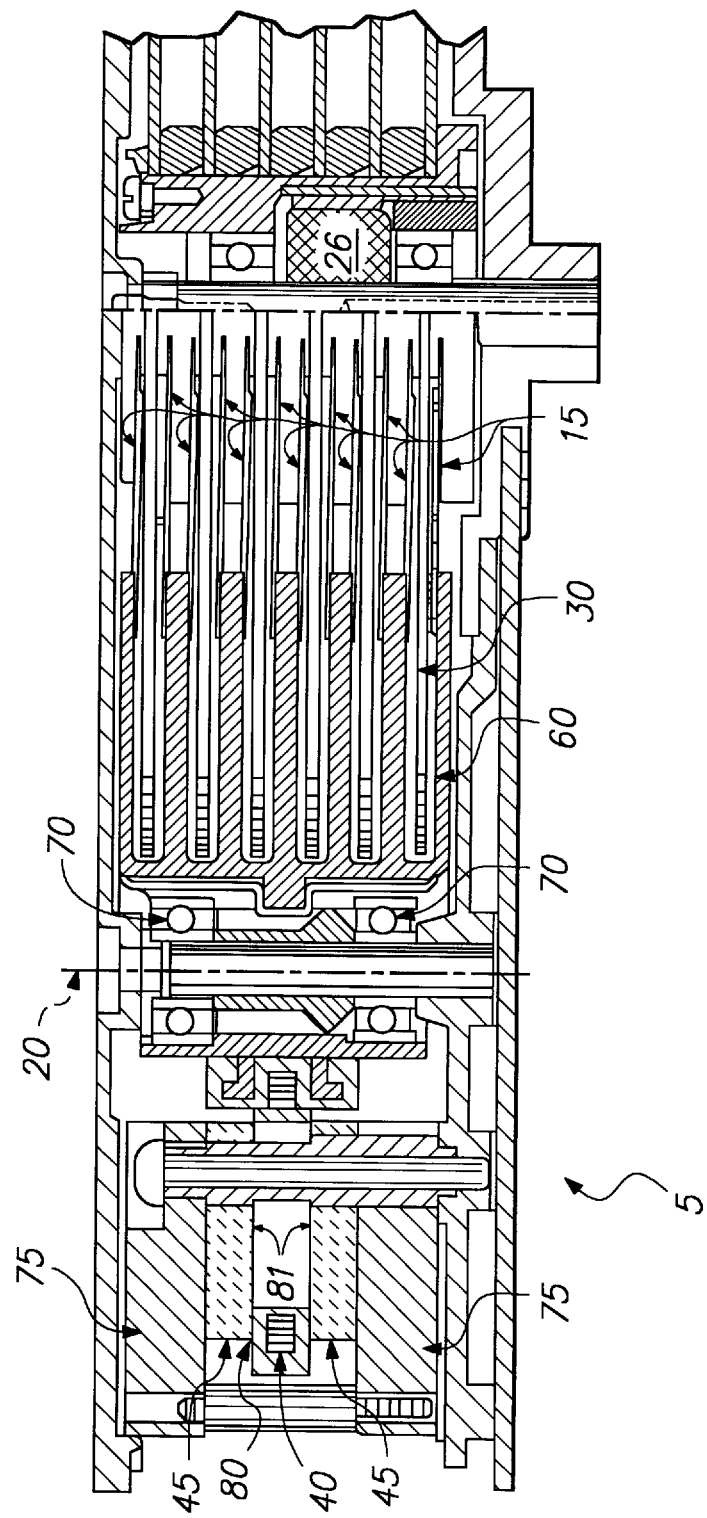
FIG. 5 is a cross-sectional view of the FIG. 1 magnetic storage disk system.

Referring to FIG. 5, the asymmetric stator magnet 45 structure is positioned intermediate the rotor winding 40 and the rigid flux conductive member 75 such that a small gap 80 is formed between the rotor winding 40 and stator magnet 45. Furthermore, the stator magnet 45 is mechanically as well as magnetically coupled to the flux conductive member 75, whereby the flux conductive member 75 forms a closed magnetic path through the rotor winding 40 and the asymmetric stator magnet 45. The flux conductive member 75 may be comprised of any one of a plurality of rigid magnetically conductive materials or alloys, however, one preferable material for the flux conductive member 75 is steel.

Preferably, the actuator motor 35 comprises a pair of asymmetrical stator magnet 45 structures. The pair of magnets 45 are oriented parallel to each other such that a small void 81 is formed therebetween. Moreover, the stator magnets 45 are oriented such that the wider first end regions 45a and the narrower second end regions 45b are substantially aligned to face each other.

Figure 3A:
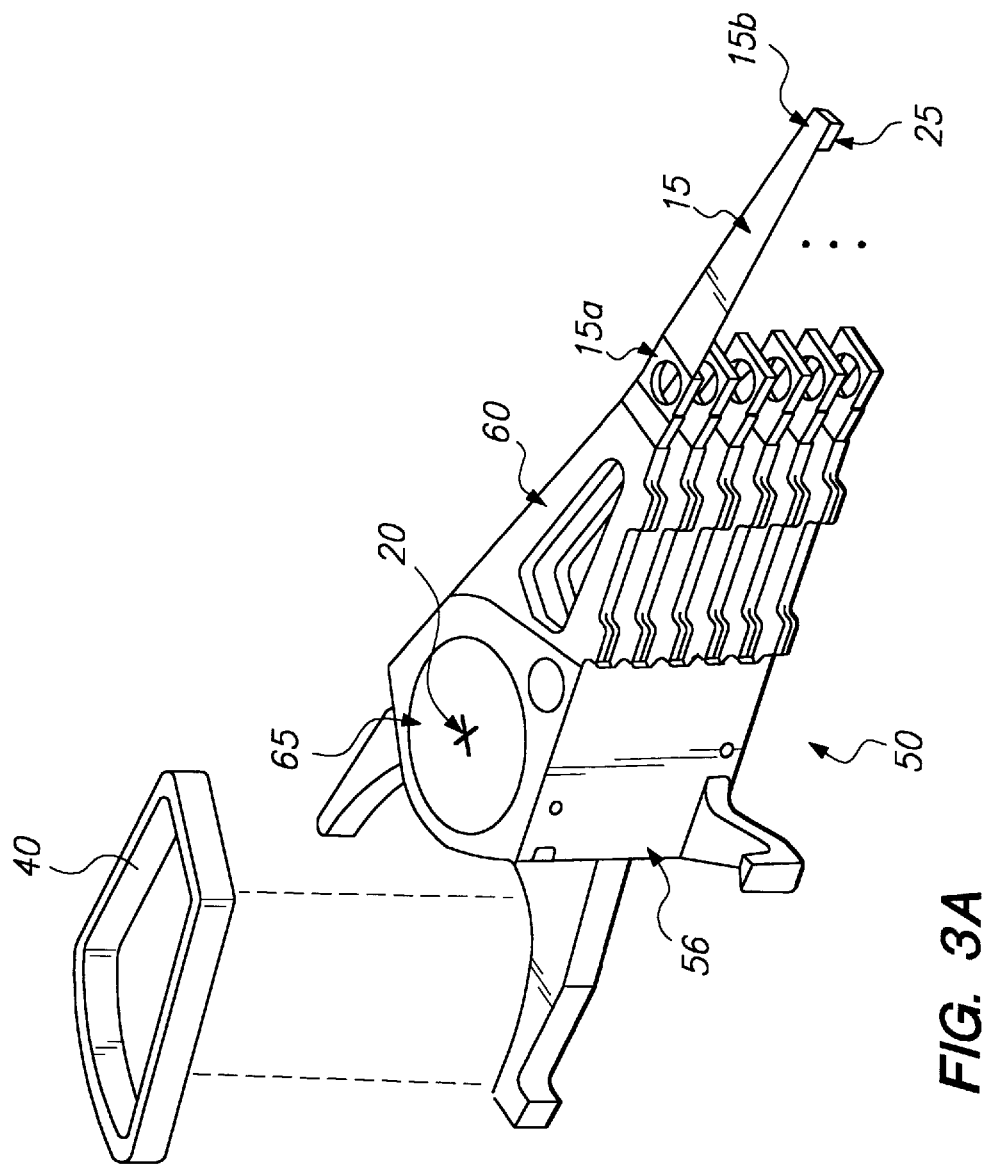
FIG. 3 (*a*) is an isometric view of the magnetic read/write head actuator assembly of FIG. 2.

Additionally, the rotor winding 40, as shown in FIGS. 3(a) and 3(b), comprises an asymmetric geometry defined on each side of a longitudinal axis 85 running along the length of the actuator arm 15. The asymmetric rotor winding 40 further includes a first winding-portion 40a on a first side of the longitudinal axis 85 and a second winding-portion 40b on a second side of the longitudinal axis 85. The first 40a and second 40b winding-portions have different longitudinal lengths. The rotor winding 40 is positioned in the small void 81 formed by the pair of stator magnet 45 structures. In one embodiment of the present invention, the winding-portion 40a has a longer longitudinal length and is positioned to magnetically communicate with the wider first end regions 45a of the asymmetric stator magnets 45, e.g., the regions of the stator magnets 45 that have a greater portion of magnetic material and the winding-portion 40b that has the shorter longitudinal length is positioned to magnetically communicate with the narrower second end regions 45b of the asymmetric stator magnets 45, e.g., the regions of the stator magnets 45 that have the lower portion of magnetic material. Collectively, the pair of asymmetric stator magnets 45 are mechanically as well as magnetically coupled to the flux conductive member 75, whereby the flux conductive member 75 forms a closed magnetic path through the rotor winding 40 and the pair of asymmetric stator magnets 45.

During operation, the improved magnetic read/write head actuator assembly 10 as set forth above positions a read/write head 25 relative to a surface of a rotating storage disk 30 with minimal average access time. The actuator assembly 10 minimizes access time by increasing the actuator motor 35 torque vector force when the disk drive storage system 5 is accessing outer diameter tracks 55a of the storage disk 30. Furthermore, the actuator assembly 10 of the present invention realizes no appreciable increases in access time to inner diameter tracks 55b of the storage disk 30. Specifically, the actuator motor 35 torque vector force is increased by increasing the strength and density of the magnetic field of the actuator motor 35 when the actuator assembly 10 is accessing outer diameter tracks 55a of the storage disk 30. According to principles of the present invention, the asymmetric geometry of the actuator motor magnet 45 structure provides a greater portion of magnetic material in a region of the structure 45 that cooperates with the actuator assembly 10 during access of said outer diameter tracks 55a. The increased magnetic field strength and magnetic field density causes a proportional increase in the torque vector force exerted on the rotor winding 40 in a direction normal to the central pivot axis 20. Therefore, when the rotor winding 40 reacts with the region of the stator magnet 45 having the greater portion of magnetic material, an increased torque vector force is realized by the rotor winding 40. The increased torque vector force realized by the rotor winding 40 is transposed to the actuator arm 15 for increasing the pivotal speed of the actuator arm 15 about the central pivot axis 20. By reversing the direction of current flow in the rotor winding 40 the torque vector force exerted thereon is likewise reversed. Thus, the actuator assembly 10 of the present invention is bi-directionally pivotal about the central pivot axis 20 with an increased pivotal speed. Therefore, an increase in the pivotal speed of the actuator assembly 10 while accessing outer diameter tracks 55a of a storage disk 30 provides a proportional decrease in the overall average access time of storage disk system 50.

Additionally, the winding-portions 40a and 40b of the rotor winding 40 are positioned to react with the magnetic field for generating the majority of the torque vector force transposed to the actuator arm 15. Since the winding-portion 40a has a longer longitudinal length for reacting with the magnetic field, that winding-portion 40a will generate a greater torque vector than the other winding-portion 40b that has the shorter length. Therefore, by positioning the rotor winding 40 such that the winding-portion having the greater length communicates with the wider first end regions 45a of the stator magnets 45, an increased torque vector is realized by the actuator assembly 10. Since the wider first end regions 45a of the stator magnets 45 are principally used when the actuator assembly 10 is accessing outer diameter tracks 55a of a storage disk system 5, the increased torque vector exerted thereon is translated into a proportional increase in the pivotal speed of the actuator arm 15.

Figure 6:
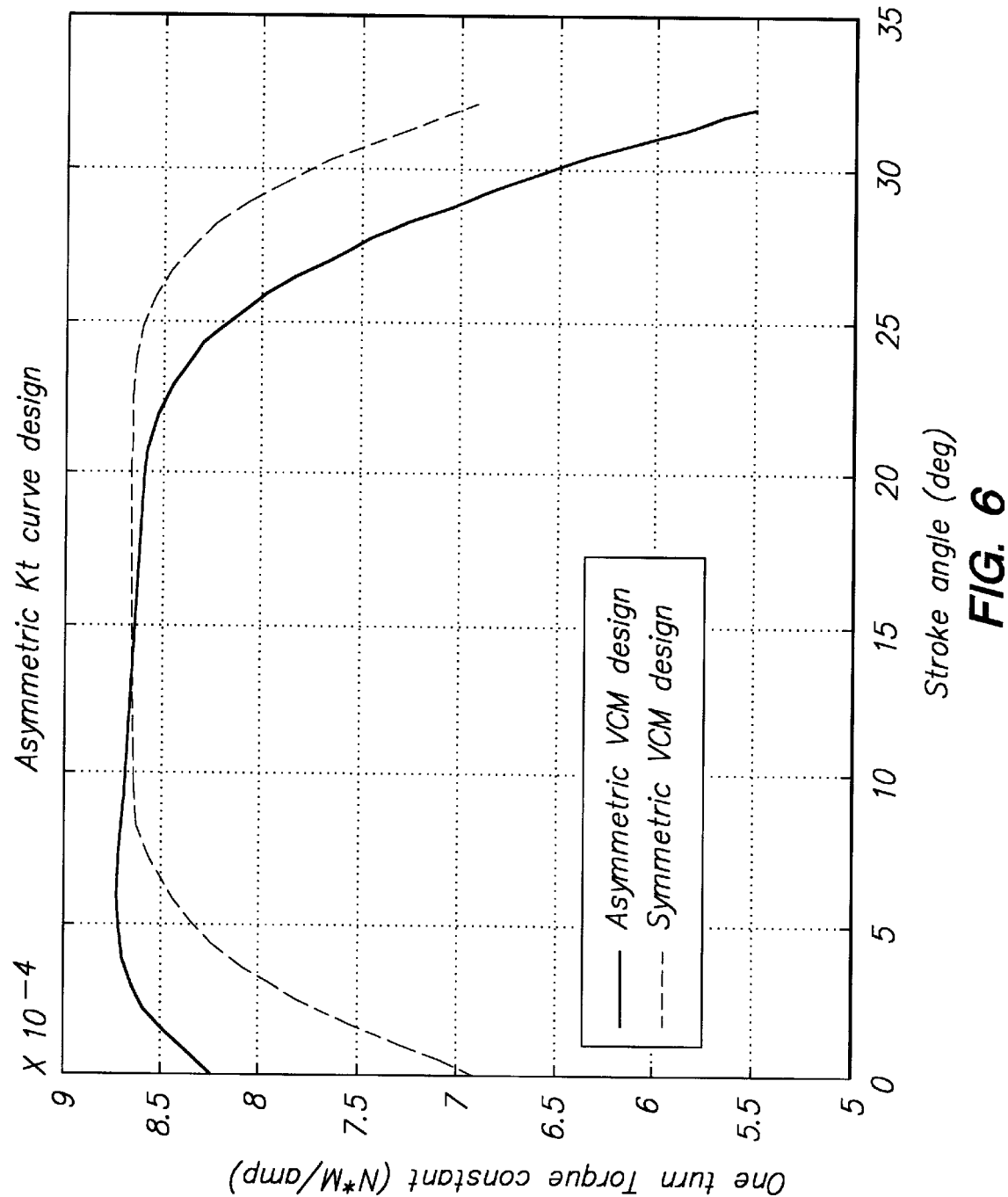
FIG. 6 is a graph illustrating a comparison of torque constants for a magnetic read/write head actuator assembly using principles of the present invention versus a conventional magnetic read/write head actuator assembly.

Referring to FIG. 6, the increased torque vector realized from principles of the present invention is illustrated in the graph as a solid line that represents a greater torque constant over the stroke angle ranging from approximately 0-degrees to 12-degrees. Conversely, a conventional actuator motor (not shown) that has a symmetric motor magnet is represented by the dashed line and illustrates a lower torque constant over the same stroke angle. Since the stoke angle ranging from approximately 0-degrees to 12-degrees represents an actuator assembly accessing data at the outer diameter tracks 55a of a storage disk 30, the actuator assembly 10 employing the asymmetric motor magnet(s) 45 will have an increased pivotal speed. Accordingly, the average access time of such an actuator assembly 10 is minimized because a greater percentage of actuator seeks are targeted at the outer diameter tracks 55a of the storage disk 30.

Furthermore, the current profiles supplied to the rotor winding 40 of the actuator motor assembly 10 are virtually unchanged. Additionally, the overall mass and volume of the asymmetric motor magnet 45 remains virtually unchanged in comparison to a conventional symmetric motor magnet (not shown). Thus, the actuator motor assembly 35, incorporating principles of the present invention, provides reduced average access time to a storage disk system 5 with no appreciable increase in power consumption.

The above described improved magnetic read/write head actuator assembly 10 has many advantages over the prior art for instance the improved actuator assembly provides an increased torque vector that provides a reduced average access time to a storage disk system 5. Additionally, the asymmetrical actuator motor 35 provides minimized average access time to a storage disk system 5 with no appreciable increase in power consumption.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. An improved actuator assembly for positioning a read/write head relative to a surface of a rotating storage disk of a storage disk system, the actuator assembly comprising:
   an actuator arm having a first end mounted to a pivotal hub, the am having a distal end for supporting the read/write head over the rotating storage disk; and
   an actuator motor including:
   (i) a rotor winding connected to the pivotal hub opposite the actuator arm;
   (ii) a flux conductive member for forming a closed flux path; and
   (iii) an asymmetrical stator magnet structure statically mounted in close proximity to the rotor winding, the stator magnet includes an asymmetric arcuate shared segment having a substantially flat planar geometry with a wider width at a just end region and a narrower width at a second end region the stator magnet having a substantially smooth transition from the wider first end region to the narrower second end region such that an increased magnetic field is generated in a region of the magnet structure having a greater portion of magnetic material to linearly increase the torque vector in said region thereby increasing the pivotal speed of the actuator arm in said region.

2. The improved actuator assembly of claim 1, wherein the stator magnet structure comprises a pair of magnets.

3. The improved actuator assembly of claim 2, wherein the stator magnets are oriented such that the wider first end region and the narrower second end region are substantially aligned to fare each other and from a small void therebetween.

4. The improved actuator assembly of claim 3, wherein the stator magnets have a substantially constant tickness.

5. The improved actuator assembly of claim 4, wherein the asymmetric stator magnets are Neodymium-Iron-Boron.

6. The improved magnetic read/write head actuator assembly of claim 3, wherein the rotor winding is positioned in the void formed by the stator magnets and comprises a coil of conductive material, the coil having an asymmetric geometry with respect to a longitudinal axis running along the length of the actuator arm.

7. The improved actuator assembly of claim 6, wherein the rotor winding further includes a first winding-portion on a first side of the longitudinal axis and a second winding-portion on a second side of the longitudinal axis, the first and second winding-portions having different lengths.

8. The improved actuator assembly of claim 7, wherein the region of the magnet structure having the greater portion of magnetic material is positioned substantially adjacent to the rotor winding-portion having the greatest longitudinal length such that a greater torque vector is realized by the actuator arm.

9. An improved actuator assembly for positioning a read/write head relative to a surface of a rotating storage disk of a storage disk system, the actuator assembly comprising:
   (A) an E-block structure, the E-block structure including:
      (1) a central hub portion, the hub having a central bore therethrough for accepting a mounting means, the E-block structure being pivotal about a central pivot axis over a predefined limited angular range;
      (2) a hub-arm portion extending outwardly from the central hub;
      (3) an actuator arm having a first end mounted on the hub-arm portion and a distal end for supporting the read/write head over the rotating storage disk;
   (B) an actuator motor assembly for cooperating with the E-block structure for positioning the read/write heads over a multiplicity of data tracks defined on the storage disk,
   the actuator motor assembly including:
      (i) a rotor winding connected to the B-block structure at an end opposite the hub-arm portion;
      (ii) a flux conductive member for from a closed flux path; and an asymmetrical stator magnet structure statically mounted in close proximity to the rotor winding, the stator magnet includes an asymmetric arcuate shaped segment having a substantially flat planar geometry with a wider width at a first end region and a narrower width at a second end region, the stator magnet having a substantially smooth transition from the wider first end region to the narrower second end region such that an increased magnetic field is generated in a region of the magnet structure having a greater portion of magnetic material to linearly increase the torque vector in said region hereby increasing the pivotal speed of the actuator arm in said region.

10. The improved actuator assembly of claim 9, wherein the stator magnet structure comprises a pair of magnets.

11. The improved actuator assembly of claim 10, wherein the stator magnets are oriented such that the wider first end region and the narrower second end region are substantially aligned to face each other and form a small void therebetween.

12. The improved actuator assembly of claim 11, wherein the stator magnets have a substantially constant thickness.

13. The improved actuator assembly of claim 12, wherein the asymmetric stator magnets are Neodymiumn-Jox-Boron.

14. The improved magnetic read/write head actuator assembly of claim 12, wherein the rotor winding is positioned in the void formed by the stator magnets and comprises a coil of conductive material, the coil having an asymmetric geometry with respect to a longitudinal axis running along the length of the actuator arm.

15. The improved actuator assembly of claim 14, wherein the rotor winding further includes a first winding-portion on a first side of the longitudinal axis and a second winding-portion on a second side of the longitudinal axis, the first and second winding-portions having different lengths.

16. The improved actuator assembly of claim 15, wherein the region of the magnet structure having the greater portion of magnetic material is positioned substantially adjacent to the rotor winding-portion having the greatest longitudinal length such that a greater torque vector is realized by the actuator arm.

* * * * *